Oct. 24, 1933.   R. LOCKYER   1,931,949
BATTERY TERMINAL PROTECTOR
Filed March 30, 1929
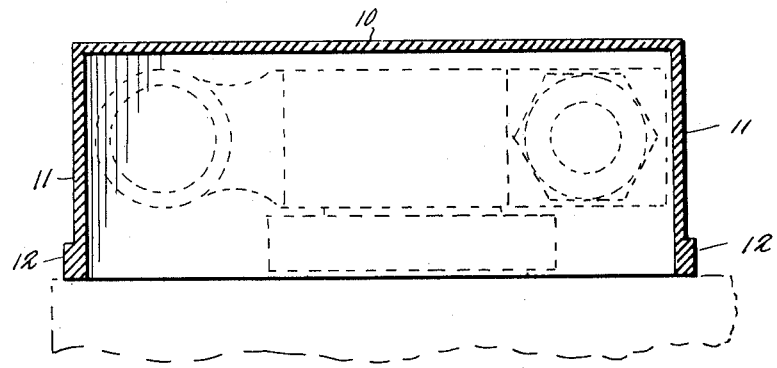
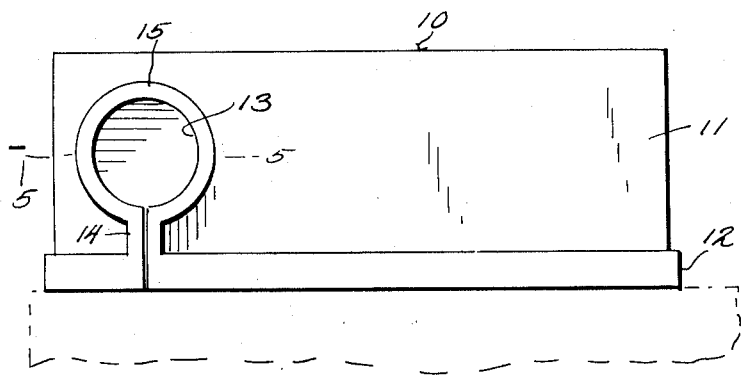
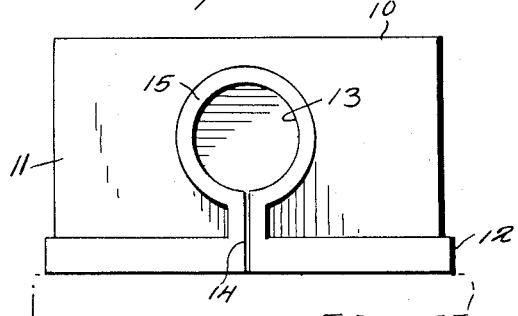
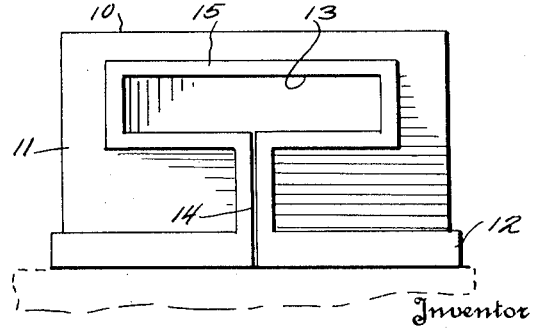
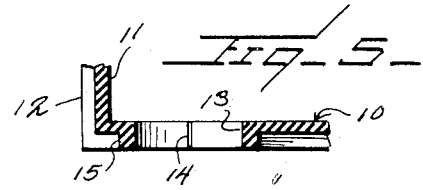
Inventor
R. Lockyer
By Watson E. Coleman
Attorney Patented Oct. 24, 1933

1,931,949

UNITED STATES PATENT OFFICE 1,931,949

BATTERY TERMINAL PROTECTOR

Robert Lockyer, Point Edward, Ontario, Canada

Application March 30, 1929. Serial No. 351,221

1 Claim. (Cl. 136—163)

This invention relates to covers or shields designed to be placed over battery terminals and the general object of this invention is to provide a shield or cover of this character of rubber or rubber composition formed to provide a box-like member open on the bottom and having at one portion thereof an opening through which battery cables may extend, said shield acting to prevent moisture and foreign matter coming in contact with exposed metal parts and battery connections, thereby keeping these parts in condition which will preserve them and such a shield further acting to prevent any short circuiting between the positive and negative posts or connections or between these posts and any exposed metal parts.

A further object is to provide a shield of rubber having an opening through which the battery cable may pass, this opening, of course, being shaped to correspond to the positive or negative cable, and the material constituting one wall of this opening being split to the edge of the shield so that the shield may be opened at this point to permit it to be placed over the negative or positive cable as the case may be.

Other objects will appear in the course of the following description.

My invention is illustrated in the accompanying drawing, wherein:—

Figure 1 is a vertical sectional view of a battery terminal cover constructed in accordance with my invention;

Figure 2 is a side elevation thereof;

Figure 3 is an end elevation of a slightly modified form of cover for a positive terminal;

Figure 4 is a like view to Figure 3 but showing a cover for a negative terminal;

Figure 5 is a section on the line 5—5 of Figure 2.

In this drawing, 10 designates a cover or shield made of relatively soft rubber but of sufficient rigidity to keep its shape, this shield being shown as approximately rectangular, though it may be of any desired form. The sides 11 of the shield extend downward from the top thereof and the lower edge of the shield has the reinforcing or thickened portion 12. At one point the shield is provided on one of the side or end walls 11 with an opening 13 through which the cable connection to the battery post may pass. The material between the opening 13 and the rim or margin of the shield is slit as at 14 to thus permit the two walls on each side of the slit to be deflected and permit the shield to be disposed over a battery post and the cable to pass through the opening 13.

Then the walls are permitted to return to their normal position in one plane which practically closes this slit 14. Preferably, the two margins of the slit 13 and the margins of the opening 13 are reinforced by an additional thickness of rubber designated 15.

Of course, the form of the opening 13 will depend upon the form of the battery connection or cable leading therefrom. The cable leading from the negative post is usually in the form of a flattened braid and in that case the opening 13 as shown in Figure 4 is rectangular in form whereas the cable leading from the positive pole is usually circular in cross section and hence the opening 13 is circular in those covers which are designed to be placed over the positive pole.

Under some circumstances, as for instance in the batteries used on Ford cars, the cable extends radially from the battery post, in which case the cover may have the form shown in Figure 3. In other cases the cable extends tangentially from the battery post, in which case the opening 13 will be disposed at one end of one wall of the cover. I do not wish to be limited to any particular shape, therefore, for these covers. They are intended to conform to the shape of the cables extending from the battery terminals. Neither do I wish to be limited to any particular composition for these covers, it being sufficient that the shield or cover shall be composed of a non-conductive material sufficiently rigid and yet of such flexibility that the portions of each side of the slit 14 may be deflected to permit the cover to be placed over a cable.

Preferably, the shield, however, will be composed of rubber compound. This shield is so formed as to permit it to be attached to the battery without in any way necessitating any part of the battery being disassembled. The shield will prevent moisture and foreign matter coming in contact with exposed metal parts, with the batteries and cable connections, thereby keeping these particular parts in a condition that will preserve them and prevent any short circuiting either between the positive and negative posts and connections or between the posts and any metal construction which may immediately surround the battery, such as metal frames or other devices for holding and carrying the batteries. These connections and all fixtures are very liable to become covered with moisture and foreign matters which are conductors of electricity and these are liable to cause short circuits in and around the storage batteries. These disadvantages are completely obviated by the use of these shields.

I claim:—

A shield for battery posts and the cable connections thereof formed of one integral piece of semi-flexible rubber, the shield comprising a box-like body entirely open at its bottom, the body having only a top wall and side walls, the inner faces of the side walls extending straight downward to the lower edge of said side walls whereby the opening defined by said side walls is equal to not less than the full cross sectional area of the body to thus permit the side walls at their lower edges to rest flat against the face of a battery cover, one of the side walls being formed with an opening for and fitting a cable connection, the material of this side wall being slit from the lower edge of the wall directly upward into said opening whereby the shield may be expanded around the cable connection when putting the shield in position.

ROBERT LOCKYER.